United States Patent [19]

Smith et al.

[11] 4,296,018
[45] Oct. 20, 1981

[54] CATECHOL OR PYROGALLOL CONTAINING FLEXIBLE INSULATING TAPE HAVING LOW GEL TIME

[75] Inventors: James D. B. Smith, Wilkins Township, Allegheny County; Robert N. Kauffman, Monroeville, both of Pa.

[73] Assignee: Westinghouse Electric Corp., Pittsburgh, Pa.

[21] Appl. No.: 39,918

[22] Filed: May 17, 1979

[51] Int. Cl.³ .................... B32B 19/02; B32B 27/38; C08K 5/07; C08K 5/13
[52] U.S. Cl. .................... 260/32.8 EP; 174/120 C; 174/120 SR; 260/33.6 EP; 260/45.75 K; 260/45.75 Q; 336/206; 427/386; 428/363; 428/413
[58] Field of Search .............. 260/33.6 EP, 32.8 EP, 260/45.75 K, 45.75 Q; 528/92, 103, 104, 361, 407; 525/524, 526, 527; 427/104, 116, 386; 428/363, 377, 414, 416, 454, 413, 324; 174/120 C, 120 SR; 336/206

[56] References Cited

U.S. PATENT DOCUMENTS

| | | | |
|---|---|---|---|
| 3,244,670 | 4/1966 | Puchala et al. | 528/92 X |
| 3,294,865 | 12/1966 | Price | 528/104 X |
| 3,716,598 | 2/1973 | Markovitz | 528/92 |
| 3,728,306 | 4/1973 | Markovitz et al. | 525/524 X |
| 3,759,866 | 9/1973 | Rogers et al. | 525/524 X |
| 3,998,983 | 12/1976 | Smith | 428/363 |
| 4,013,987 | 3/1977 | Foster | 528/92 X |
| 4,046,938 | 9/1977 | Torossian et al. | 428/363 X |
| 4,085,250 | 4/1978 | Smith | 528/92 X |
| 4,112,183 | 9/1978 | Smith | 428/363 |
| 4,137,275 | 1/1979 | Smith et al. | 525/524 X |
| 4,169,825 | 10/1979 | Yapp et al. | 260/33.6 EP |
| 4,178,323 | 12/1979 | Chattha | 260/33.6 EP |
| 4,192,786 | 3/1980 | Shibayama et al. | 528/92 X |

FOREIGN PATENT DOCUMENTS

971525 3/1965 United Kingdom .

*Primary Examiner*—Bruce H. Hess
*Attorney, Agent, or Firm*—R. D. Fuerle

[57] ABSTRACT

A flexible mica tape having a low gel time is prepared from a composition of an epoxy resin, an organotin salt, and catechol or pyrogallol. A mica sheet is immersed in the composition and the solvent is evaporated to form a tack-free A-staged resin. A conductor is wound with the tape and is impregnated with an impregnating resin using vacuum-pressure impregnation.

8 Claims, 5 Drawing Figures

CATECHOL OR PYROGALLOL CONTAINING FLEXIBLE INSULATING TAPE HAVING LOW GEL TIME

BACKGROUND OF THE INVENTION

U.S. Pat. No. 4,112,183, upon which this invention is an improvement, discloses a flexible mica tape with excellent physical and electrical properties. However, due to higher prices for energy, it was desirable to reduce the time and temperature necessary to cure the resin used in that tape. Many alterations in the composition of the resin were tried in order to reduce the gel time without reducing the excellent physical and electrical properties of the tape. For example, dibutyl tin oxide catalysts and bisphenol A epoxy resins by themselves were tried but neither worked.

SUMMARY OF THE INVENTION

We have discovered that a tape having physical and electrical properties comparable to those of U.S. Pat. No. 4,112,183, but with much reduced gel time and temperature, can be prepared by the inclusion of catechol or pyrogallol in the resin formulation.

We have also discovered that a much lower power factor can be obtained if multifunctional, higher aromatic, or novolac epoxy resins are used. These resins also give better high temperature factors and better tensile properties.

Unlike the tape of U.S. Pat. No. 4,112,183, however, the tape of this invention is preferably not fully loaded, so that it can be used with an impregnating resin in a VPI process.

PRIOR ART

U.S. Pat. No. 4,112,183 discloses a flexible epoxy-impregnated mica tape upon which this invention is an improvement.

U.S. Pat. No. 3,716,598 discloses an epoxy composition containing catechol and a tin oxide which cures at room temperature.

British Pat. No. 971,525 discloses an epoxy resin containing phenols and triphenyl tin chloride.

DESCRIPTION OF THE INVENTION

One type of epoxide or epoxy resin which may be used in the invention is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the chemical structural formula:

where n is an integer of the series 0, 1, 2, 3 . . . , and R represents the divalent hydrocarbon radical of the dihydric phenol. Typically R is:

to provide a diglycidyl ether of bisphenol A type epoxide or to provide a diglycidyl ether of bisphenol F type epoxide resin.

The bisphenol epoxides used in the invention have a 1,2-epoxy equivalency greater than one. They will generally be diepoxides. By the epoxy equivalency, reference is made to the average number of 1,2 epoxy-groups, contained in the average molecule of the glycidylether. Typically, epoxy resins of bisphenol are readily available in commercial quantities and reference may be made to The Handbook of Epoxy Resins, by Lee and Neville for a complete description of their synthesis.

Other glycidylether resins that are useful in this invention include polyglycidylethers of a novolac. These resins are preferred as they give lower power factors, better high temperature properties, and better tensile strength. The polyglycidylethers of a novalac suitable for use in accordance with this invention are prepared by reacting an epihalohydrin with pheno formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

The product of the reaction is generally a massive oxidation resistant aromatic compound, one example of which is represented by the chemical structural formula:

wherein n is an integer of from 0 to 6.

Although epoxy novolac resins from formaldehyde are generally preferred for use in this invention, epoxy novolac resins from any other aldehyde such as, for example, acetaldehyde, chloroaldehyde, butylaldehyde, furfuraldehyde, can also be used. Although the above formula shows a completely epoxidized novolac, other epoxy novolacs which are only partially epoxidized can be useful in this invention. An example of a suitable epoxy novolac is 2,2,bis[p-(2,3-epoxypropoly)-phenyl]-methane. These resins are well known in the art and reference may be made to *The Handbook of Epoxy Resins* for a complete description of their synthesis.

Multi-functional epoxy resins are also useful epoxy resins in this invention. These resins are somewhat similar to epoxy novolacs, and can be mixtures of epoxy novolacs with bisphenol A or bisphenol F epoxides. These resins generally have extremely high temperature resistance and are commercially available as polyfunctional epoxy resins. One particularly useful resin of this type is based on triphenol methane, and has the chemical structure:

Other useful epoxy resins include glycidyl esters, hydantoin epoxy resins and cycloaliphatic epoxy resins.

The glycidyl ester epoxy resins which can be employed in this invention are non-glycidyl ether epoxides containing more than one 1,2 epoxy group per molecule. They are characterized by substitution of the ester bond.

for the ether bond, —O—, and have the chemical structural formula;

where R is an organic radical substituent selected from the group consisting of R', R'—O—R', R'—COO—R', and mixtures thereof, where each R' is independently selected from the group consisting of alkylene groups, having from about 1 to about 8 carbon atoms, saturated cycloalkylene groups where the ring has 4 to 7 carbons and mixtures thereof, where n is from about 1 to about 8.

The hydantoin epoxy resins which can be employed in this invention are based on hydantoin, a nitrogen-containing heterocyclic ring having the structure:

A wide variety of compounds can be formed by reacting the nitrogen positions in the five membered hydantoin ring. The hydantoin ring is readily synthesized from ketones, hydrogen cyanide, ammonia, carbon dioxide, and water. The epoxy resins are formed through reaction of the hydantoin with epichlorohydrin. Hydantoin rings can be linked together for form extended resins analogous in structure to bisphenol A. Polyfunctional resins can also be formed from these chain-extended materials by glycidylization of they hydroxyls and the remaining nitrogens. These heterocyclic glycidyl amine epoxy resins can be represented by the structural formula:

The cycloaliphatic type epoxides employed as the resin ingredient in the invention are selected from non-glycidyl ether epoxides containing more than one 1,2-epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides, or ketones, to give the compound R—COOOH. These resins are well known in the art and reference may be made to Brysdon, J., *Plastic Materials*, 166, 471, for their synthesis and description.

Such non-glycidyl ether cycloaliphatic epoxides are here characterized by the absence of the ether oxygen bond, i.e., C—O—C, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. The term "epoxide" as herein used is equivalent to the term "epoxy resin."

Examples of non-glycidyl ether cycloaliphatic epoxides would include 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl-3,4-epoxy-6-methylcyclohexane carboxylate and dicyclopentadiene, having the following respective structures:

Other useful cycloaliphatic epoxides include 2-(3,4-epoxycyclohexyl-5,5-spiro-3,4-epoxy)cyclohexanemetadioxane and 3,4-epoxy-6-methylcyclohexylmethyl adipate.

A distinguishing feature of many of the non-glycidyl ether cycloaliphatic epoxides is the location of the epoxy group(s) on a ring structure rather than on an aliphatic side chain. Generally, the cycloaliphatic epoxide particularly useful in this invention will have the formula selected from the group consisting of:

where s stands for a saturated ring structure, R is selected from the group consisting of $CHOCH_2$, $O(CH_2)_nCHOCH_2$, and $OC(CH_3)_2CHOCH_2$ radicals where $n = 1$ to 5, R' is selected from the group consisting of hydrogen, methyl, ethyl, propyl, butyl, and benzyl radicals and R" is selected from the group consisting of $CH_2OOC$ and $CH_2OOC(CH_2)_4COO$ radicals.

All of these epoxy resins can be characterized by reference to their epoxy equivalent weight (EEW), which is defined as the mean molecular weight of the particular resin divided by the mean number of epoxy radicals per molecule. In the present invention, the suitable solid bisphenol A and bisphenol F epoxides will have a preferred epoxy equivalent weight of from about 340 to about 1,500; the suitable liquid bisphenol A and bisphenol F epoxides will have a preferred epoxy equivalent weight of from about 150 to about 250; the suitable epoxy-novolac resins are solids and will have a preferred epoxy equivalent weight of from about 100 to about 500; the suitable solid multi-functional epoxy resins will have a preferred epoxy equivalent weight of from about 185 to about 350; the suitable semi-solid multi-functional epoxy resins will have a preferred epoxy equivalent weight of from about 100 to about 185; the suitable hydantoin resins are semi-solid and will have a preferred epoxy equivalent weight of from about 150 to about 200; the suitable solid cycloaliphatic epoxides will have a preferred epoxy equivalent weight of from about 350 to about 1,000; the suitable liquid cycloaliphatic epoxides will have a preferred epoxy equivalent weight of from about 50 to about 400; the suitable solid glycidyl ester epoxies will have a preferred epoxy equivalent weight of from about 250 to about 1,000; and the suitable liquid glycidyl ester epoxies will have a preferred epoxy equivalent weight of from about 150 to about 350.

The epoxide system can be all semi-solid materials, but preferably is a mixture of liquid epoxide with either solid or semi-solid epoxide. An all solid epoxide will not provide a flexible mica pre-preg insulating tape, and an all liquid epoxide will not provide a non-tacky insulating tape. When a solid is used with a liquid, the preferred weight ratio of solid epoxide to liquid epoxide is from about 1.5:1 to about 8.0:1. When a semi-solid is used with a liquid, the preferred weight ratio of semi-solid epoxide to liquid epoxide is from about 0.2:1 to about 20:1. Semi-solid resins are characterized by low temperature softening points, usually below 60° C., and relatively low viscosities at slightly elevated temperatures, i.e., about 25,000 cps. to about 75,000 cps. at 125° F.

The epoxide resin must be mixed with a ketone or aromatic hydrocarbon solvent for the epoxide resin and preferably a dual solvent system consisting of a mixture of a ketone plus an aromatic hydrocarbon co-solvent selected from the group of benzene and arene and their mixtures. The ketone will have from 3 to 6 total carbon atoms in the molecule. Particularly useful ketones are acetone, methyl ethyl ketone, and methyl isobutyl ketone. The arene is selected from the group of toluene, ethylbenzene, xylene, and their mixtures.

Ketones or arenes having higher molecular weights than those described above will present problems of solvent flash off without catalyzing the resin system, i.e., solvent removal would require temperatures of about 175° C., which would activate the catalyst and begin resin polymerization. The preferred weight ratio of ketone to benzene and/or arene is from about 70:30 to 30:70. This range provides the best solubility for all components, optimum volatility characteristics for solvent flash off, good wetting and resin saturation of the mica in the insulating tape.

The solvent content of the impregnant solution of polymerizable resin must be within a weight ratio of total epoxides to total solvent of from about 85:15 to about 10:90, i.e., a solvent content between about 15 to about 90% by weight of the epoxide-solvent mixture based on total solvent plus total weight of epoxide. Above about 70% solvent not enough epoxide will be impregnated into the mica, causing void formation. Under about 15% solvent, the composition will be too viscous and will result in poor impregnant penetration, uneven resin distribution through the mica, and poor mica organo-tin contact. The viscosity of the impregnant solution of polymerizable resin must be between about 25 to about 200 cps., but preferably between about 40 to about 100 cps., at 25° C. By operating within this range, complete resin saturation of the tape is assured, i.e., about 20 to about 40 weight percent of the tape will be epoxide, based on the weight of epoxide, backing, and mica.

The useful latent catalysts for this particular resin system are covalently bonded organo-tin compounds having the general chemical structural formula:

(R)₃SnX where each R is independently selected from the group consisting of alkyl groups having from about 1–10 carbon atoms; aryl groups, such as phenyl, i.e., naphthyl, i.e.,

Cl, Br, or NO₂ substituted aryl groups such as where the substituents selected from Cl, Br, and NO₂ are substituted for hydrogens on the cyclic structure; aralkyl groups, such as with the alkyl constituent having from about 1–10 carbon atoms; alkaryl groups, such as benzyl groups, i.e., with the alkyl constituents having from about 1 to about 10 carbon atoms; Cl, Br, or NO₂ substituted alkaryl groups such as where the substituents selected from Cl, Br, and NO₂ are substituted for hydrogens on the cyclic structure, with the alkyl constituent having from about 1 to about 10 carbon atoms; cycloalkyl (alkylene) groups selected from cyclopentane groups, cyclopentene groups, cyclopentadiene groups, cyclohexane groups, cyclohexene groups, and cyclohexadiene groups; and heterocyclic groups selected from the pyrrolidine groups pyrrole groups tetrahydrofuran groups dioxane groups pyridine groups and piperidine groups

Over 10 carbons in an alkyl group leads to insolubility in the epoxy resin. Preferably, the R constituents will be selected from the group consisting of alkyl groups, benzyl groups, and phenyl groups.

The X substituent is selected from the group consisting of halide, preferably Cl, hydroxide, acetate, butyrate, propionate, and dimethylphosphate. Examples of some suitable preferred compounds would include, for example:

i.e., triphenyl-tin chloride; tri N-butyl-tin chloride, and tribenzyl-tin chloride Others would include, for example, trimethyl-tin chloride; triethyl-tin chloride; tripropyl-tin chloride, triphenyl-tin bromide, triphenyl-tin iodide; triphenyl-tin acetate; triphenyl-tin propionate; triphenyl-tin dimethyl phosphate; tribenzyl-tin bromide; tribenzyl-tin hydroxide; tribenzyl-tin butyrate; tribenzyl-tin propionate, tribenzyl-tin dimethyl phosphate; trinaphthyl-tin chloride; and the like, with triphenyl tin chloride and acetate being the most preferred because they are less expensive and more reactive.

These particular organo-tin compounds were found to be compatible with mica to provide very safe, non-exothermic latent catalysts. They allow the epoxide impregnated mica tape system to remain flexible during solvent removal and to be stored without appreciable stiffening for 6 to 12 months at 25° C. The covalent bonding of these compounds assures that no ionic fragments are present in the cured resin to deleteriously affect electrical properties. A complete description of the preparation of these compounds is given by Ingham R. K., Rosenberg S. D., and Gilman H., in "Organo-Tin Compounds," *Chem. Reviews*, Vol. 60, 1960, pp. 459-525, herein incorporated by reference.

The catalyst of this invention, when it contacts the mica, acts as a latent catalyst, i.e., one which will not start to polymerize the resin at temperatures of up to 120° C., but will cure it quickly at elevated "kick off" temperatures of 120° C. and above even when used in small quantities. A latent catalyst effect is required because the impregnated mica tape must be subjected to an evaporative solvent removal step for a short period of time at tape and resin-solvent-catalyst temperatures of between about 65° C. to 115° C. without substantial epoxide resin cure. If the mica tape becomes stiff even to a minor degree it will not be useful as an insulating winding tape material for motor and generator coils. If a sufficient amount of the dispersed organo-tin does not saturate between the mica particles and layers a latent catalyst effect will not be initiated and the epoxide will start to gel at temperatures over about 25° C.

It is essential that no anhydride, boron trifluoride, amine, phenol, or amide curing agent be used in this system, otherwise the composition will start to cure during solvent flash off causing stiffness and shortening the storage life of the insulation. Use of the organo-tin compounds described above allows complete substitution for the usual amine or polycarboxylic acid anhydride curing agent with a substantial cost reduction and improved electrical and storage properties. The use of the organo-tin compounds allows elimination of stabilizing, reactive, low viscosity epoxide diluents, such as neopentyl diglycidyl ether, which seem to cause excessive tackiness in pre-impregnated tapes.

The organo-tin compounds, after impregnation and contact with the mica, do not initiate gellation of the epoxide resin during the period of solvent flash off, which should last no longer than 12 minutes at tape and resin temperature no higher than 115° to 120° C., corresponding to maximum oven temperatures of 150° C. The formation of a highly stable organo-tin-mica complex allows longer flash off periods at relatively high temperatures, without any substantial epoxide reaction, thus assuring complete solvent removal and absence of voids in the insulated tape which might harm electrical properties. After complete solvent flash off, the epoxide is in a substantially unreacted and uncured, fusible, solid condition, i.e., dry to the touch, non-tacky, containing up to about 3 wt.% solvent, i.e., about 97 to 99 wt.% solids, no more than about 3 to 10% reacted, and capable of fusion upon heating to a fully cured infusible thermoset state.

It is believed that a large portion of the organo-tin compounds uniformly distributed through and substantially unreacted with the epoxide mixture form an effectively stable and latent complex with contacting mica which curbs the epoxide polymerization until resin temperatures of over 120° are reached. At resin temperatures above 120°, preferably 140° to 160°, the breakdown or disassociation of these complexes give rise to highly reactive species which are extremely potent and able to very quickly promote polymerization of the epoxy groups. Long cure times over 120° would result in significant resin drainage, high void contents and high power factor values. The epoxide latent catalyst combinations of this invention provide outstanding resin flow and fast cure times to give superior properties for high voltage insulation application.

While we do not wish to be held to any particular theory, we believed that a substantial portion of the organo-tin compounds, up to about 90 weight percent of that present in the admixture depending on mica type and particle size, complexes with contacting mica before or during the solvent flash evaporation step. It is thought that about one-half of the organo-tin compounds that will form a latent catalyst with the mica will do so upon impregnation, while the rest will complex during solvent removal, as the concentration and intimate contact of the organo-tin compounds increases.

Chemically, natural mica is a complex silicate of aluminum with potassium, magnesium, iron, sodium, lithium, and traces of other elements. The mica most frequently used in insulation are the muscovite $KAl_2(AlSi_3O_{10})(OH)_2$ and phlogopite $KMg_3AlSi_3O_{10}(OH)_2$ types. It seems possible that the organo-tin compounds which are near or drawn to the alkali aluminum silicate will form complexes or adducts at the basic sites of the mica structure. With muscovite, the most commonly used mica dielectric, these basic sites are most likely to be found at the covalent linkage. Thus, bonding between an organo-tin, such as tribenzyltin-chloride and muscovite mica could take place as shown:

Here the electron donating atom is oxygen. These structures are not established or fully understood and are not to be taken as limiting, but are set out as a possible explanation of the observed facts. These adducts would be formed at resin temperatures up to 120° C. and dissociated by heating over about 125° C. Without the mica present to chemically interact and form latent catalyst complexes with the organo-tin compounds, the epoxide resin would react with the organo-tin compound and would not provide a flexible tape. Also, other materials than mica, for example, cellulose paper, linen, polyester, cotton, nylon, and polyethylene do not appear to form these complexes with organo-tin compounds.

The amount of organo-tin compound used must be soluble in the epoxide-solvent system, yet be effective to cure the impregnated mica sheet during the final cure-heating step after solvent flash off without degradation of the epoxide resin. The effective amount of organo-tin compound used in this invention will be from 0.01 to 5.0 parts and preferably from about 0.5 to about 1.0 part per 100 parts epoxide resin.

Use of more than the above specified broad range amounts of organo-tin compound will provide too much catalyst in the mixture and will cause loss of flexibility and poor shelf life in the uncured impregnated mica insulation. Use of over 5 parts of organo-tin per 100 parts epoxide could also cause a degradative oxidation effect on the epoxide in the cured mica insulation, causing significant weight loss over 125° C., leading to void formation and catastrophic breakdown of insulating properties. Use of less than the above specified broad range amounts of organo-tin compound will not provide enough catalyst to effectively polymerize the epoxide during final cure, causing poor gel times and sluggish curing of the epoxide resin in the mica insulation.

The epoxy resin composition of this invention includes about 0.001 to about 1 phr of an activator of catechol, pyrogallol, or mixtures thereof. More than 1 phr activator reduces shelf life and less than 0.001 is ineffective. The preferred amount of activator is about 0.05 to about 5 phr.

The composition may optionally contain up to about 2% by weight unreactive dye or pigment. Dyes and pigments are preferably not used, however, as they may impair the desirable properties of the tape.

In the method of this invention: (1) the epoxide is mixed with the solvent, (2) from the 0.01 to 5 parts per 100 parts epoxide resin of the organo-tin compound is added, along with the activator, slowly with stirring to the epoxide solution at temperatures of up to about 35° C. to form a homogeneous admixture, (3) the epoxide solution admixture is applied to a flexible insulation substrate, which will contain mica sheet in the form of paper, integrated flake paper, flakes, or large splittings, by any suitable means such as by brushing, dipping, spraying, etc., (4) the mica sheet insulation containing the contacting applied solution is generally heated at a temperature and for a time, generally about 1 to 12 minutes at a mica sheet and resin temperature of between 65° to 120° C., i.e., an oven temperature of between about 85° to 150° C., effective to drive off or flash off substantially all of the solvent. Solvent could also be removed by suitable forced air drying or vacuum techniques. At least about 95 weight percent and preferably, about 97 weight percent of the solvent present in the solution will be removed to form substantially unreacted epoxide of about 97 to about 99 percent solids, so that there is minimal solvent remaining upon final curing of the insulation. In some instances, to expedite solubility of the epoxy resin components, "warm-bleeding" of these components might be carried out prior to adding solvent. This "warm-blending" is normally done at about 30 to about 100° C.

In step (3) it is preferable not to saturate the resin. The mica should be at least 5% by weight saturated as less resin will not hold the mica together well, but more than about 25% saturated makes impregnation during VPI difficult. About 10 to about 20% by weight resin is preferred.

A sufficient amount of mica-organo-tin chemical interaction by complexing is believed to take place in steps (3) and (4), allowing solvent flash off without any substantial epoxide-organo-tin reaction, at tape temperatures of up to 120° C. In step (4), while the oven temperature may be about 150° C., the mica tape and resin-solvent-catalyst temperatures are below 120° C. because of the cooling effect of solvent evaporation, and because the mica insulation is only in the oven for a short period of time.

Finally, the winding tape insulation is cooled to room temperature, at which time it is flexible, tack-free, and can be wound onto a takeup reel without blocking or sticking, and stored for up to 1 year without losing flexibility and tack-free properties. It can then be tightly wrapped, either by hand or using commercial coil wrapping machines, onto coils and other metallic electrical conductors as a curable pre-preg which does not require vacuum resin impregnation. However, a VPI process is preferably used for the most thorough insulation. A solventless epoxy resin such as that described in U.S. Pat. No. 4,113,791 is preferred as it is compatible with the resin on the tape. After flash off, the epoxide is a fusible, dry, uncured solid, containing preferably only about 3 weight percent solvent residue based on epoxide, mica, solvent, catalyst weight. The epoxide in the mica sheet is capable of being finally, fully cured, generally at a resin temperature of at least 120° C., preferably 150 to 160° C., for 2 to 24 hours, to remove the solvent residue and to advance the resin to an infusible thermoset state, by complete catalytic polymerization with the organo-tin latent catalyst. During cure the mica and resin temperatures shortly reach oven or press temperatures.

Figure 1:
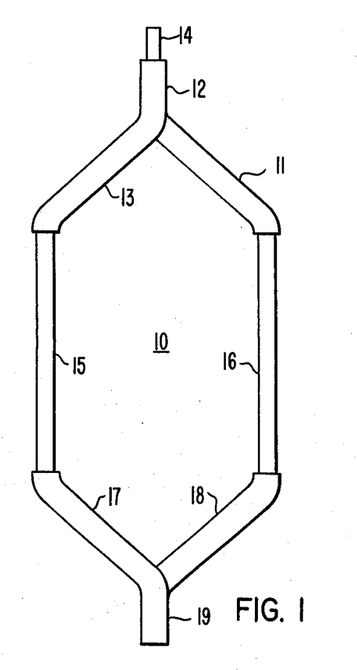
FIG. 1 is a plan view of a closed electrical coil member having two slot portions.

One type of a closed full coil 10 which may be prepared in accordance with the present invention is illustrated in FIG. 1. The full coil comprises an end portion comprising a tangent 11, a connecting loop 12, and another tangent 13 with bare leads 14 extending therefrom. Straight slot portions 15 and 16 of the coil, which have not been hot pressed to cure the resin and to form them to predetermined shape and size, are connected to the tangents 11 and 13 respectively. These slot portions are connected to other tangents 17 and 18 connected through another loop 19.

The complete full coils prepared as disclosed herein, are placed within the slots of the stator or rotor of an electrical machine and the end windings are wrapped and tied together. The uninsulated leads are then soldered, welded, or otherwise connected to each other or to the commutator. Thereafter, the entire machine will be placed in an oven and heated to a temperature effective to cure the completely reactive composition in the mica tape insulating the coil.

Figure 2:
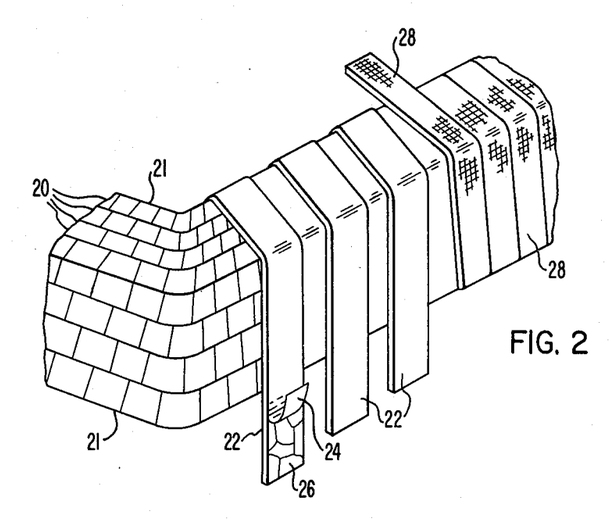
FIG. 2 is an isometric fragmentary view showing part of a copper coil being wound with the flexible impregnated mica tape of this invention.

Referring to FIG. 2 of the drawings, there is illustrated a coil suitable for use in high-voltage electric motors and generators. The full coil would be disposed within the slots of the metal stator surrounding the metal motor armature or generator rotor and could also be used in the armature and rotor slots. The coil comprises a plurality of turns of conductors 20. Each turn of the conductor 20 consists essentially of a copper bar or wire wrapped with turn insulation 21. The turn insulation 21, preferably is prepared from a fibrous sheet or strip impregnated with a bonding resin. Glass fiber cloth, paper, asbestos cloth or asbestos paper treated with a resin may be used with equally satisfactory results. The resin applied to the turn insulations to bond them together may be a phenolic resin, an alkyd resin, a melamine resin, or the like, or mixtures of any two or more of these.

The turn insulation is not adequate to withstand the severe voltage gradients that will be present between the conductor and ground when the coil is installed in a high-voltage electrical machine. Therefore, a ground insulation for the coil is provided by wrapping plural layers of composite mica tape 22 about the turn 20. Such composite tape 22 can comprise a pliable backing sheet 24 of, for example, polyethylene glycol terephthalate mat having a layer of mica flakes 26 bonded thereto. The tape may be applied half lapped, abutted, or otherwise. Generally, a plurality of layers of the composite tape 22 are wrapped about the coil with 16 or more layers generally being used for high voltage coils. To impart better abrasion resistance and to secure a tighter insulation, a wrapping of an outer tape 28 of a tough fibrous material, for example, glass fiber, asbestos, or the like is applied to the coil.

The pre-impregnated mica tape 22 for insulating the coils shown in FIGS. 1 and 2, may be prepared from a sheet backing support material upon which is disposed a layer of mica in the form of integrated flake paper, flakes, splitting, or very fine particle size mica paper. The sheet backing and the mica are contacted and bonded together with liquid resinous impregnant. This mica insulation is preferably in the form of a tape of the order of ½ inch to 2 inches in width, though sheet insulation of any other width may be prepared.

For building electrical machines, such as motors and generators, the sheet backing for the mica may comprise cellulose paper, cotton, or linen fabrics, asbestos paper, woven glass cloth or glass fibers, sheets, or fabrics prepared from synthetic resins such as nylon, polyethylene, and linear polyethylene terephthalate resins, or additional mica paper sheets. Sheet backing material of a thickness of approximately 1 mil (0.001 in. or 0.0025 cm.), to which there has been applied a layer of from 3 to 10 mils thickness of mica has been successfully employed.

Mica flakes are generally about 1/16 to ¾ inch square while mica splittings are generally about ¾ to 3 inches square. Integrated mica flake paper is of compacted mica particles about 1/32 to ½ inch square and fine mica paper is made of compacted mica particles about 1/64 to 1/16 inch square. Generally, the finer the mica particles, the more interaction with the organotin catalyst.

The mica tape is impregnated with the liquid, completely reactive polymerizable resinous compositions of this invention so that there is complete saturation between mica layers. After impregnation with the solvent is flashed off and the flexible pre-preg test is stored or wrapped around the coil or other conductor. The insulated coil, after wrapping, is then exposed to the application of heat and pressure to provide a thermally stable, tough, cured insulation in the thermoset state. No vacuum impregnation step is needed, but it is preferably used.

Coils insulated with the highly flexible, impregnated, mica wrapping of this invention are placed in a hot press in which the slot portions are subjected to heat and pressure for a period of time to cure the resinous composition in the slot portions. The end portions of the windings will be substantially uncured. This hot pressing operation produces a coil having a slot portion of the exact size required for the electrical machine and can be fitted into the slots of the electrical machine readily with flexing of the end portions. The mica wrapping must contain substantially unreacted resin so that there is considerable flow and consolidation of the resin during hot pressing, otherwise void formation will result. For this reason a completely B-staged resin system would provide a high void formation possibly causing premature breakdown of the insulation under high voltage conditions.

Sometimes the wrapped motor coils are impregnated under vacuum and pressure (VPI process) with another solventless epoxy resin prior to final cure in the oven at 150° to 160° C.

Figure 3:
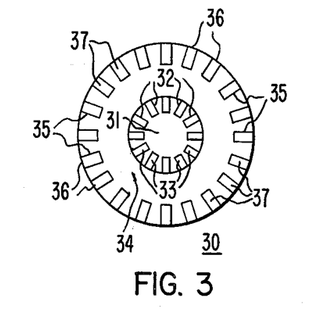
FIG. 3 is a cross-sectional view of a motor, containing coils wound with the impregnated mica tape of this invention.
Figure 4:
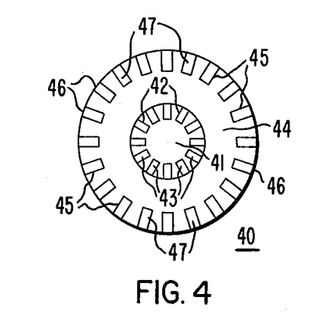
FIG. 4 is a cross-sectional view of a generator, containing coils wound with the impregnated mica tape of this invention.

By way of illustration, FIG. 3 shows one embodiment of a motor 30 in cross section. The motor comprises a metal armature 31 having slots 32 therein, containing insulated coils 33, surrounded by a metal stator 34 having slots 35 therein about the stator circumference at 36. The stator slots contain insulated coils 37. All the insulation on the coils 33 and 37 can comprise the highly flexible pre-preg mica winding tape composites of this invention. FIG. 4 shows one embodiment of a generator 40 in cross section. The generator comprises a metal rotor 41 having slots 42 therein, containing insulated coils 43, surrounded by a metal stator 44 having slots 45 therein about the stator circumference at 46. The stator slots contain insulated coils 47 and may also contain inner cooling channels not shown. All of the insulation on the coils 43 and 47 can comprise the high flexible, pre-preg mica winding tape composites of this invention.

The following non-limiting examples are illustrative of various resin formulations and pre-preg insulating tape composites of this invention.

The following examples further illustrate this invention:

EXAMPLE 1

Compositions were prepared as a 50% solids solution, is a 1:1 molar ratio of methyl ethyl ketone to toluene of a solid cycloaliphatic epoxy resin having an EEW of 370 to 425 sold by Union Carbide under the trade designation "ERRA 4221," a bisphenol A epoxy sold by Celanese Corp. under the trade designation "EPI-REZ 5162," or an epoxy-novolak sold by Dow Chemical Co. under the trade designation "DEN 439," a reactive modifier of cycloaliphatic epoxy sold by Union Carbide under the trade designation "ERL 4221," 0.10 pbw triphenyl tin chloride, and an accelerator of catechol. The following table gives the amounts of resin, reactive modifier, and catechol.

| Experiment No.* | Resin (pbw) | Reactive Modifier (pbw) | Catechol Accelerator (pbw) |
|---|---|---|---|
| 1 | ERRA 4211 (75) | 25 | 0.10 |
| 2 | ERRA 4211 (75) | 25 | 0.20 |
| 3 | ERRA 4211 | | |

-continued

| Experiment No.* | Resin (pbw) | Reactive Modifier (pbw) | Catechol Accelerator (pbw) |
|---|---|---|---|
| | (75) | 25 | 0.50 |
| 4 | ERRA 4211 (70) | 30 | 0.10 |
| 5 | ERRA 4211 (75) | 25 | 0.05 |
| 6 | ERRA 4211 (65) | 35 | 0.10 |
| 7 | ERRA 4211 (75) | 25 | 0.00 |
| 8 | EPI-REZ 5162 (75) | 25 | 0.10 |
| 9 | DEN 439 (75) | 25 | 0.10 |
| 10 | EPI-REZ 5162 (70) | 30 | 0.10 |

Using a woven glass fabric as backing material (107 glass), 4×4 inch pieces of mica (sold by U.S. Samica Corp. under the trade designation "Micanite II" or "Amber Cogemica") were prepared by brushing the resin solutions onto the mica (with the glass fabric on top). The solvents were then removed by placing the mica sample in an oven for 6 minutes at 150° C. At this time the sample was checked for flexibility and degree of tack. It was then weighed to find the amount of resin pickup. Typical data found with these samples indicated pick-up values of 28 to 34% shown in the following table.

| Experiment No. | Original Mica Weight (g) | Mica Weight After Impregnation* (g) | Resin Pick-Up (g) | Resin in Mica |
|---|---|---|---|---|
| 1 | 9.58 | 12.66 | 3.08 | 32.2 |
| 2 | 9.08 | 12.23 | 3.15 | 34.7 |
| 3 | 8.96 | 11.45 | 2.49 | 27.8 |
| 4 | 9.50 | 12.42 | 2.92 | 30.7 |
| 5 | 9.46 | 12.30 | 2.84 | 30.0 |
| 6 | 9.29 | 11.94 | 2.65 | 28.5 |
| 7 | 9.38 | 12.13 | 2.75 | 29.3 |
| 8 | 9.43 | 12.57 | 3.14 | 33.3 |
| 9 | 9.56 | 12.49 | 2.93 | 30.6 |
| 10 | 9.36 | 12.46 | 3.10 | 33.1 |

*Weighed after 6 min. at 150° C. to remove solvent.

Although the resin contents of these mica samples were greater than those derived from VPI applications, they were made purposely to accelerate the storage stability effect, flexibility, tack, electrical, and other useful properties.

The storage characteristics of the tapes were evaluated by checking flexibility at monthly intervals.

Composites were then made with the mica products for power factor and dielectric constant measurements. This was done by stacking four pieces of each mica product (4×4 in.) on top of each other and curing them between metal plates for 8 hours at 135°–150° C. Under these conditions, the applied pressure on most of the samples was about 0.5 lb/in². The resulting sample thicknesses were about 30 mils. In later experiments (numbers 8, 9, and 10) higher pressures (100 to 200 psi) were used during initial cure.

To explore the effects of adding catechol accelerator to these mica composites in more detail, "Audrey" dielectric analysis was used. In this analysis a measure of gel time of the mica-epoxy resin composite (and hence, a measure of the effect of adding catechol), is shown by the "Peak Time" value (measured in minutes). "Audrey" data obtained with some of mica composite samples are shown in the following table.

| Experiment No.* | Amount of Catechol Accelerator Used (pbw)** | Ratio of ERRA 4211 to ERL 4221 in Formulation | Peak Time (min) |
|---|---|---|---|
| 1 | 0.10 | 75/25 | 30 |
| 2 | 0.20 | 75/25 | 9 |
| 4 | 0.10 | 70/30 | 27 |
| 5 | 0.05 | 75/25 | 85 |
| 6 | 0.10 | 65/35 | 65 |
| 7 | 0.00 | 75/25 | 335 |

*Experiments conducted on mica composite samples.
**Triphenyltin chloride content constant at 0.10% resin.

Figure 5:
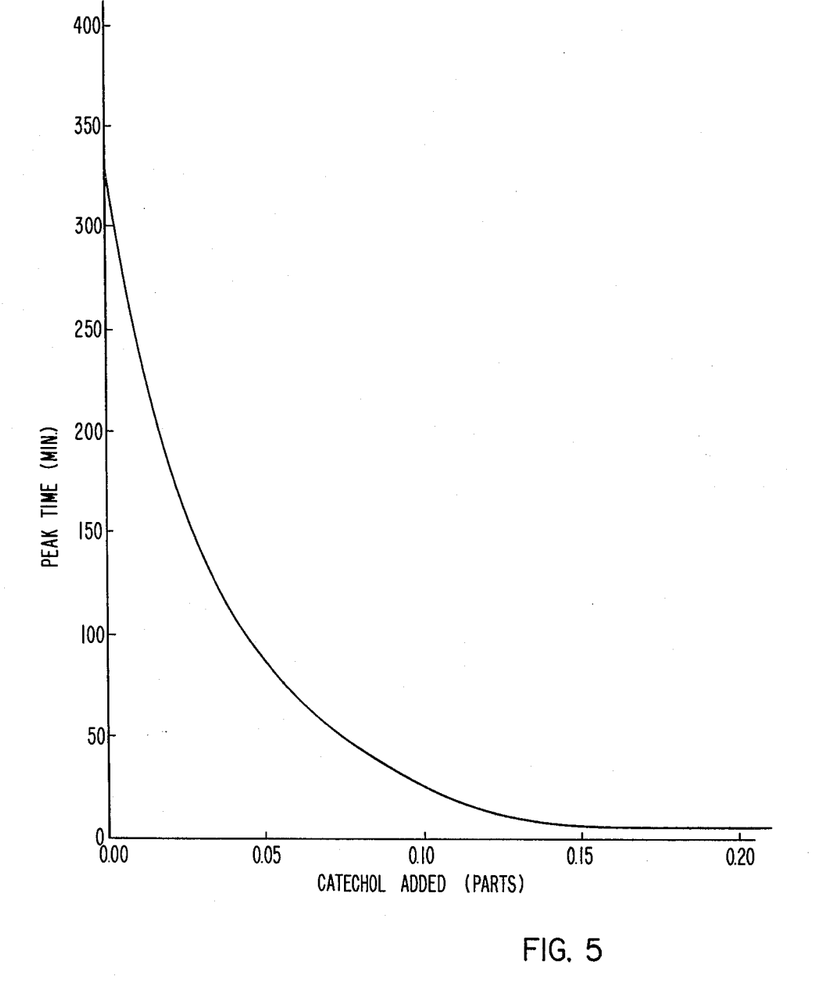
FIG. 5 is a graph showing the effect of catechol on the gel time of an epoxy resin.

Quite clearly the addition of catechol to these mica composites gives considerably lower "Peak Times" (and hence, faster gel times) than a formulation without catechol (Experiment 7). This effect is more clearly shown in FIG. 5 for a constant resin composition with variable amounts of catechol present.

The effect of varying the ratio of the ERRA 4211 resin to ERL 4221 is not very clear from the data in the above table, but, nevertheless, there is some indication that increasing the amount of ERL 4221 in the resin formations gives longer "Peak Times" and a slower curing system.

Electrical data obtained with some of the mica composites are shown in the following table:

| Experiment No. | Cure Schedule | Mica Composite Electrical Properties | | | |
|---|---|---|---|---|---|
| | | 135° C., 60 Hz | | 150° C., 60 Hz | |
| | | Tan δ | ε' | Tan δ | ε' |
| 1 | 8 h at 135° C. | 11.0 | 5.7 | 16.0 | 5.2 |
| 2 | " | 8.0 | 5.0 | 12.0 | 4.3 |
| 3 | " | 5.2 | 4.5 | 8.6 | 4.3 |
| 4 | " | 6.0 | 5.0 | 6.4 | 4.3 |
| 5 | " | 6.1 | 5.1 | 6.2 | 5.2 |
| 8 | 8 h at 150° C. | — | — | 21.0 | — |
| 8 | 16 h at 150° C. | — | — | 17.0 | — |
| 9 | 8 h at 150° C. | — | — | 22.0 | — |
| 9 | 16 h at 150° C. | — | — | 19.0 | — |
| 10 | 8 h at 150° C. | — | — | 24.0 | — |
| 10 | 16 h at 150° C. | — | — | 22.0 | — |

*Samples prepared by stacking 4 (4 × 4 in.) pieces of resin treated mica.

It is seen that, even with a minimal cure of 8 h at 135° C., acceptable power factors (measured at 135° C.) are obtained with most of the samples. With Experiments, 3, 4, and 5 values of <10% at 150° C. are obtained after curing for only 8 h at 135° C.

EXAMPLE 2

The following compositions were prepared, where "TPTCl" is triphenyl tin chloride and "MEK" is methyl ethyl ketone, by hot-blending "Epi-Rez" SU resins to 100° C. and adding solvent. "Epi-Rez" SU resins are a family of multi-functional epoxy resins sold by Celanese Corp. and range from viscous liquids (SU-2.5) to hard solids (SU-3, SU-5, and SU-8). The E.E.W. for these resins are SU-2.5=189, SU-3=193, SU-5=290, and SU-8=210.

| | | pbw |
|---|---|---|
| Solution 1 | DEN 439 | 85 |
| | ERL 4221 | 15 |
| | TPTCl | 0.10 |

-continued

| | | pbw |
|---|---|---|
| | Catechol | 0.20 |
| | MEK | 150 |
| | Toluene | 150 |
| Solution 2 | DEN 439 | 90 |
| | ERL 4221 | 10 |
| | TPTCl | 0.10 |
| | Catechol | 0.20 |
| | MEK | 125 |
| | Toluene | 175 |
| Solution 3 | EPI-REZ SU-8 | 90 |
| | ERL 4221 | 10 |
| | TPTCl | 0.10 |
| | Catechol | 0.10 |
| | MEK | 150 |
| Solution 4 | XD-7342, 0.01 | 90 |
| | ERL 4221 | 10 |
| | TPTCl | 0.20 |
| | Catechol | 0.20 |
| | MEK | 125 |
| | Toluene | 175 |
| Solution 5 | EPI-REZ SU-5 | 90 |
| | EPI-REZ SU-2/5 | 10 |
| | Catechol | 0.1 |
| | TPTCl | 0.1 |
| | Toluene | 150 |
| | MEK | 150 |
| Solution 6 | EPI-REZ SU-5 | 90 |
| | EPI-REZ SU-3 | 10 |
| | Catechol | 0.1 |
| | TPTCl | 0.1 |
| | Toluene | 150 |
| | MEK | 150 |
| Solution 7 | EPI-REZ SU-5 | 80 |
| | EPI-REZ SU-2.5 | 20 |
| | Catechol | 0.1 |
| | TPTCl | 0.1 |
| | Toluene | 150 |
| | MEK | 150 |
| Solution 8 | EPI-REZ SU-8 | 90 |
| | EPI-REZ SU-2.5 | 10 |
| | Catechol | 0.1 |
| | TPTCl | 0.1 |
| | Toluene | 150 |
| | MEK | 150 |
| Solution 9 | EPI-REZ SU-8 | 80 |
| | EPI-REZ SU-2.5 | 20 |
| | Catechol | 0.1 |
| | TPTCl | 0.1 |
| | Toluene | 150 |
| | MEK | 150 |
| Solution 10 | EPI-REZ SU-8 | 70 |
| | EPI-REZ SU-2.5 | 30 |
| | Catechol | 0.1 |
| | TPTCl | 0.1 |
| | Toluene | 150 |
| | MEK | 150 |

The mica samples were prepared with 15% resin and checked for cure after 2 hours at 150° C. If necessary, catechol and TPTCI concentrations were increased. Micanite II composites were made by brushing the above solutions on mica (+glass backing). The flexibility was checked after flashing off the solvents by heating for 6 minutes at 150° C.

The curability of the materials was checked after 16 minutes at 150° C. If promising, mica composite samples were made with epoxy impregnant sold by Westinghouse Electric Corp. as "53841 PU" and epoxy impregnant sold by Westinghouse Electric Corp. as "53841 WS" for power factor measurements at 150° C.

The following table gives the results:

| Solution No. | Mica Bond Resin Composition | Mica Composite 150° C. Electrical Properties** | |
|---|---|---|---|
| | | 100 × Tan δ | $\epsilon'$ |
| 5 | EPI-REZ SU-5/SU-2.5 (90:10) | 14.0 | 3.88 |
| 6 | EPI-REZ SU-5/SU-3 (90:10) | 15.9 | 4.20 |
| 7 | EPI-REZ SU-5/SU-2.5 (80:20) | 16.9 | 4.76 |
| 7 | EPI-REZ SU-8/SU-2.5 (90:10) | 7.8 | 3.29 |
| 9 | EPI-REZ SU-8/SU-2.5 (80:20) | 8.9 | 4.07 |
| 10 | EPI-REZ SU-8/SU-2.5 (70:30) | 10.9 | 3.87 |

*Catalyzed with Triphenyltin chloride/catechol (0.1% each) using 15% (w/w) Micabond resin in Mica
**After impregnation with an epoxy resin sold by Westinghouse Electric Corp. under its designation "53841WS" and cured 16 hours at 150° C.

The following is the composition of:

| | |
|---|---|
| DER 332 (Bis 'A') from Dow Chemical Co. | 50 parts |
| Diglycidyl ether of Neopentyl glycol from Ciba-Geigy | 50 parts |
| 1-methyltetrahydrophthalic anhydride from Union Carbide | 105 parts |
| Chromium acetylacetonate from Ventron Corp. | 0.1 parts |

We claim:

1. A composition comprising:
(A) semi-solid epoxide, a mixture of solid epoxide and liquid epoxide or a mixture of semi-solid epoxide and liquid epoxide, with a solvent for said epoxide selected from the group consisting of ketones, aromatic hydrocarbons, and mixtures thereof, where the weight ratio of total epoxide to total solvent is from about 85:15 to about 10:90;
(B) about 0.01 to about 5.0 phr of an organo-tin compound having the structural formula:

$(R)_3 SnX$ where each R is independently selected from the group consisting of alkyl groups having from about 1 to 10 carbon atoms, aryl groups, Cl, Br, or NO₂ substituted aryl groups, alkaryl groups with the alkyl constituent having from 1 to 10 carbon atoms, Cl, Br, or NO₂ substituted alkaryl groups with the alkyl constituent having from about 1 to 10 carbon atoms, aralkyl groups with the alkyl constituent having from about 1 to 10 carbon atoms, cyclopentane, groups, cyclopentene groups, cyclopentadiene groups, cyclohexane groups, cyclohexene groups, cyclohexadiene groups, pyrrolidine groups, pyrrole groups, tetrahydrofuran groups, dioxane groups, pyridine groups and piperdine groups, and each X is selected from the group consisting of halide, hydroxide, acetate, butyrate, propionate, and dimethyl phosphate; and
(C) about 0.001 to about 1 phr of an activator selected from the group consisting of catechol, pyrogallol, and mixtures thereof.

2. A composition according to claim 1 wherein said epoxide is a mixture of solid epoxides and liquid epoxides, wherein the weight ratio of solid epoxide to liquid epoxide is from about 1.5:1 to about 8.0:1, a mixture of semi-solid epoxides and liquid epoxides, wherein the weight ratio of semi-solid epoxide to liquid epoxide is from about 0.2:1 to about 20:1, and semi-solid epoxides, the solvent is a mixture of ketone and aromatic hydrocarbon co-solvent selected from the group consisting of benzene and arene solvents and mixtures thereof, wherein the ratio of ketone to co-solvent is from about 70:30 to about 10:90, and the arene is selected from the group consisting of toluene, ethylbenzene, xylene, and mixtures thereof.

3. A composition according to claim 1 wherein about 0.05 to about 1.0 part of organo-tin is used per 100 parts of total epoxide.

4. A composition according to claim 1 wherein said solvent is selected from the group consisting of ketones having from 3 to 6 carbon atoms in the molecule, benzene, toluene, ethylbenzene, xylene, and mixtures thereof, and wherein the weight ratio of solid epoxide to liquid epoxide is from about 1.5:1 to about 8.0:1.

5. A composition according to claim 1 wherein said organo-tin compound is selected from the group consisting of triphenyl-tin chloride, tri-n-butyl-tin chloride, tribenzyl-tin chloride, triphenyl tin acetate, and mixtures thereof.

6. A composition according to claim 1 wherein said activator is catechol.

7. A composition according to claim 1 wherein said liquid epoxide is selected from the group consisting of biphenol A epoxides having an E.E.W. of about 150 to about 250, biphenol F epoxides having an E.E.W. of about 150 to about 250, cycloaliphatic epoxides having an E.E.W. of about 50 to about 400, glycidyl ester epoxides having an E.E.W. of about 150 to about 350, and mixtures thereof, said semisolid epoxide is selected from the group consisting of multi-functional epoxy resins having an E.E.W. of about 100 to about 185, hydantoin resins having an E.E.W. of about 150 to about 200, and mixtures thereof, and said solid epoxide is selected from the group consisting of biphenol A epoxides having an E.E.W. of about 340 to about 1500, biphenol F epoxides having an E.E.W. of about 340 to about 1500, epoxynovalacs having an E.E.W. of about 100 to about 500, multi-functional epoxy resins having an E.E.W. of about 185 to about 350, cycloaliphatic epoxides having an E.E.W. of about 350 to about 1000, glycidyl ester epoxides having an E.E.W. of about 250 to about 1000, and mixtures thereof.

8. A composition comprising
(A) solid epoxide resin, liquid epoxide resin, and solvent selected from the group consisting of ketones having from 3 to b 6 carbon atoms in the molecule, benzene, toluene, ethylbenzene, xylene and mixtures thereof; wherein the weight ratio of solid epoxide to liquid epoxide is from about 1.5:1 to about about 8.0:1, and the weight ratio of total epoxide to total solvent is from about 85:15 to about 10:90;
(B) about 0.01 to about 5.0 parts per 100 parts epoxide resin of an organo-tin compound selected from the group consisting of triphenyl-tin chloride, tri-n-butyl-tin chloride, tribenzyl-tin chloride, triphenyl tin acetate, and mixtures thereof, and
(C) about 0.05 to about 0.5 phr catechol.

* * * * *